United States Patent
Adachi

(10) Patent No.: US 8,985,063 B2
(45) Date of Patent: Mar. 24, 2015

(54) HOT-WATER SUPPLY SYSTEM

(75) Inventor: Ikuro Adachi, Nagoya (JP)

(73) Assignee: Rinnai Corporation, Nagoya-Shi (JP)

( * ) Notice: Subject to any disclaimer, the term of this patent is extended or adjusted under 35 U.S.C. 154(b) by 743 days.

(21) Appl. No.: 13/203,568

(22) PCT Filed: Mar. 10, 2010

(86) PCT No.: PCT/JP2010/053999
§ 371 (c)(1),
(2), (4) Date: Aug. 26, 2011

(87) PCT Pub. No.: WO2010/104109
PCT Pub. Date: Sep. 16, 2010

(65) Prior Publication Data
US 2011/0303165 A1 Dec. 15, 2011

(30) Foreign Application Priority Data
Mar. 11, 2009 (JP) ................... 2009-058221

(51) Int. Cl.
*F22B 27/00* (2006.01)
*F24D 17/00* (2006.01)
(Continued)

(52) U.S. Cl.
CPC ........ *F24D 17/0073* (2013.01); *F24D 17/0031* (2013.01); *F24D 17/02* (2013.01); *F24D 19/1051* (2013.01); *F24D 19/1054* (2013.01); *F24H 1/523* (2013.01); *Y02B 30/12* (2013.01)
USPC ............. 122/14.1; 122/14.21; 122/14.22; 122/40; 122/41; 122/448.1

(58) Field of Classification Search
CPC ............ F22B 27/00; F24H 4/00; F24H 4/02; F24H 4/04
USPC ............ 122/40, 41, 448.1, 14.1, 14.21, 14.22
See application file for complete search history.

(56) References Cited

U.S. PATENT DOCUMENTS

2005/0189431 A1* 9/2005 Nakayama et al. ............. 237/12
2007/0214816 A1* 9/2007 Fukunaga et al. ........... 62/238.6
(Continued)

FOREIGN PATENT DOCUMENTS

JP 2000-329401 11/2000
JP 2003-130452 5/2003
(Continued)

OTHER PUBLICATIONS

"2006349323—Machine Translation", translation of the foreign document listed above published in 2006.*

*Primary Examiner* — Alissa Tompkins
*Assistant Examiner* — Nathaniel Herzfeld
(74) *Attorney, Agent, or Firm* — Rankin, Hill & Clark LLP

(57) ABSTRACT

When a detection temperature by a hot-water tank thermister (42) has been equal to or lower than a re-heating determination temperature over at least a re-heating determination time, a tank controller (50) performs a sterilization process by heating hot water within a hot-water tank (30) by means of a heat pump unit (60); and when the detection temperature by the hot-water tank thermister (42) has been equal to or lower than a determination temperature for prohibiting the use of hot water in the hot-water tank over at least a determination time for prohibiting the use of hot water in the hot-water tank, the tank controller (50) performs only a temperature regulation control via heating while keeping a hot-water flow regulation valve (34) in a closed state.

4 Claims, 6 Drawing Sheets

(51) Int. Cl.
*F24D 17/02* (2006.01)
*F24D 19/10* (2006.01)
*F24H 1/52* (2006.01)

(56) References Cited

U.S. PATENT DOCUMENTS

2011/0272132 A1* 11/2011 Koch et al. .................. 165/287
2011/0315091 A1* 12/2011 Adachi et al. ................ 122/14.1

FOREIGN PATENT DOCUMENTS

| JP | 2004-263912 | 9/2004 |
| JP | 2005042965 | 2/2005 |
| JP | 2006-275337 | 10/2006 |
| JP | 2006-322650 | 11/2006 |
| JP | 2006-349323 | 12/2006 |
| JP | 2006349323 A * | 12/2006 |

* cited by examiner

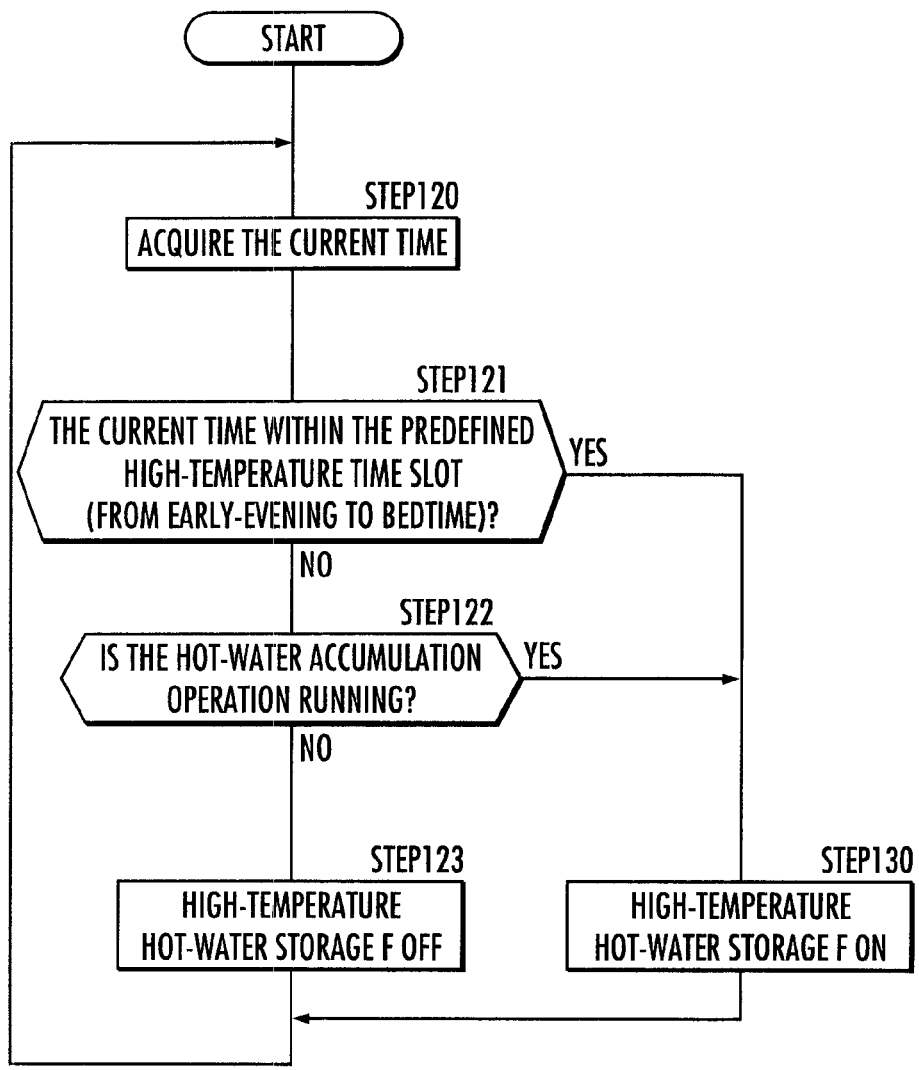

HOT-WATER SUPPLY SYSTEM

TECHNICAL FIELD

The present invention relates to a hot-water supply system having a hot-water supply apparatus of an instantaneous heating type connected in series at a downstream side of a hot-water tank unit.

BACKGROUND ART

Hitherto, there has been known a hot-water supply system having a hot-water supply apparatus of an instantaneous heating type connected in series at a downstream side of a hot-water tank unit in which water in a hot-water tank is heated by a heat pump (for example, refer to Japanese Patent Laid-open No. 2000-329401).

When the hot-water stored in the hot-water tank is being supplied, if the temperature of the hot-water in the hot-water tank has been continued to be low, it is easy for bacteria such as *Legionella* or the like to reproduce in the hot-water of the hot-water tank. Therefore, there has been proposed a hot-water supply system which boils the hot-water in the hot-water tank up to a high temperature in a time slot of late evening to sterilize the bacteria so as to prevent insanitary hot-water containing the bacteria from being supplied (for example, refer to Patent Document 2: Japanese Patent Laid-open No. 2003-130452).

However, if the time setting of the hot-water supply system is not performed or the setting for boiling the hot-water in the hot-water tank up to a high temperature is not performed, the reproduction of the bacteria in the water of the hot-water tank progresses, which makes it a problem that the water containing a lot of bacteria is supplied from the hot-water supply system.

SUMMARY OF THE INVENTION

Problems to Be Solved by the Invention

The present invention has been accomplished in view of the aforementioned problems, and it is therefore an object of the present invention to provide a hot-water supply system capable of preventing hot-water containing a lot of bacteria from being supplied from a hot-water tank even though a setting for boiling the hot-water in the hot-water tank to a high temperature periodically is not performed.

Means for Solving the Problems

To attain an object described above, the present invention provides a hot-water supply system comprising: a hot-water tank, a hot-water supply pipe connected to the hot-water tank, a water supply pipe connected to the hot-water tank and the hot-water supply pipe, a heating unit configured to heat water in the hot-water tank, a water current sensor configured to detect a water current to the water supply pipe, a hot-water flow regulation valve disposed between a joint location of the hot-water supply pipe to the hot-water tank and a joint location of the hot-water supply pipe to the water supply pipe for regulating an opening degree of the hot-water supply pipe, a water flow regulation valve disposed between a joint location of the water supply pipe to the hot-water tank and a joint location of the water supply pipe to the hot-water supply pipe for regulating an opening degree of the water supply pipe, a hot-water storage temperature sensor configured to detect a temperature of the water in the hot-water tank, a hot-water supply apparatus disposed in the midway of the hot-water supply pipe at a downstream side of the joint location between the hot-water supply pipe and the water supply pipe for heating the water flowing through the hot-water supply pipe, a hot-water supply temperature setting unit configured to set a desired hot-water supply temperature, and a temperature regulation control unit configured to perform a temperature regulation control via mixing by prohibiting the heating by the hot-water supply apparatus and regulating a mixing ratio of the hot-water supplied from the hot-water tank to the hot-water supply pipe and the water supplied from the water supply pipe to the hot-water supply pipe by means of the hot-water flow regulation valve and the water flow regulation valve so as to supply the hot-water having the desired hot-water supply temperature from the hot-water supply pipe when the water current is detected by the water current sensor and the detection temperature by the hot-water storage temperature sensor is higher than a hot-water shortage determination temperature set according to the desired hot-water supply temperature, and to perform a temperature regulation control via heating by permitting the heating by the hot-water supply apparatus so as to supply the hot-water having the desired hot-water supply temperature from the hot-water supply pipe when the water current is detected by the water current sensor and the detection temperature by the hot-water storage temperature sensor is equal to or lower than the hot-water shortage determination temperature.

The hot-water supply system further comprises a sterilization processing unit configured to perform a sterilization process by heating the hot-water in the hot-water tank equal to or higher than a sterilization temperature set according to an assumption that bacteria in the hot-water tank will be sterilized under such temperature by means of the heating unit when the detection temperature by the hot-water storage temperature sensor has been equal to or lower than a re-heating determination temperature set according to an assumption that the reproduction of bacteria in the hot-water tank will progress under such temperature over at least a predefined re-heating determination time, when the detection temperature by the hot-water storage temperature sensor has been equal to or lower than a determination temperature for prohibiting the use of hot-water in the hot-water tank which is set equal to or lower than the re-heating determination temperature over at least a determination time for prohibiting the use of hot-water in the hot-water tank set equal to or longer than the re-heating determination time, the temperature regulation control unit performs only the temperature regulation control via heating while maintaining the hot-water flow regulation valve in a closed state regardless of the detection temperature by the hot-water storage temperature sensor.

According to the present invention, the sterilization process is performed by the sterilization processing unit when the detection temperature by the hot-water storage temperature sensor has been equal to or lower than the re-heating determination temperature over at least the predefined re-heating determination time, which makes higher the possibility that the bacteria has been increased in the hot-water of the hot-water tank. According thereto, in the hot-water supply system in which the setting for boiling the hot-water in the hot-water tank periodically is not performed, it is possible to prevent the hot-water in the hot-water tank from being heated unnecessarily so as to inhibit unnecessary energy consumption and to sterilize the water in the hot-water tank efficiently.

Further, when the detection temperature by the hot-water storage temperature sensor has been equal to or lower than the determination temperature for prohibiting the use of hot-water in the hot-water tank over at least the determination time for prohibiting the use of hot-water in the hot-water tank, which could lead to a problem that the bacteria is reproducing in the water of the hot-water tank, the temperature regulation control unit performs only the temperature regulation control via heating while maintaining the hot-water flow regulation valve in a closed state regardless of the detection temperature by the hot-water storage temperature sensor. According thereto, in addition to preventing the hot-water containing a lot of bacteria from being supplied from the hot-water tank to a hot-water supply pipe, it is also possible to continue the hot-water supply from the hot-water supply pipe according to the temperature regulation control via heating.

The sterilization processing unit is composed of a controller operated according to a power supply, and after the controller is actuated according to the initiation of the power supply, the sterilization processing unit determines whether or not the detection temperature by the hot-water storage temperature sensor is equal to or higher than a sterilization determination temperature set lower than the re-heating determination temperature and performs the sterilization process as soon as the detection temperature by the hot-water storage temperature sensor is lower than the sterilization determination temperature.

According to the present invention, after the controller is actuated according to the initiation of the power supply, and when the detection temperature by the hot-water storage temperature sensor is lower than the sterilization determination temperature, if the hot-water in the hot-water tank continues to be equal to or lower the re-heating determination temperature, it is possible that the bacteria in the water of the hot-water tank has been increased. In this case, it is possible to sterilize the bacteria in the water of the hot-water tank quickly by performing the sterilization process.

BRIEF DESCRIPTION OF THE DRAWINGS

FIG. 6 is a flow chart illustrating ON/OFF setting of a high temperature hot-water storage flag.

MODE FOR CARRYING OUT THE INVENTION

Figure 1:
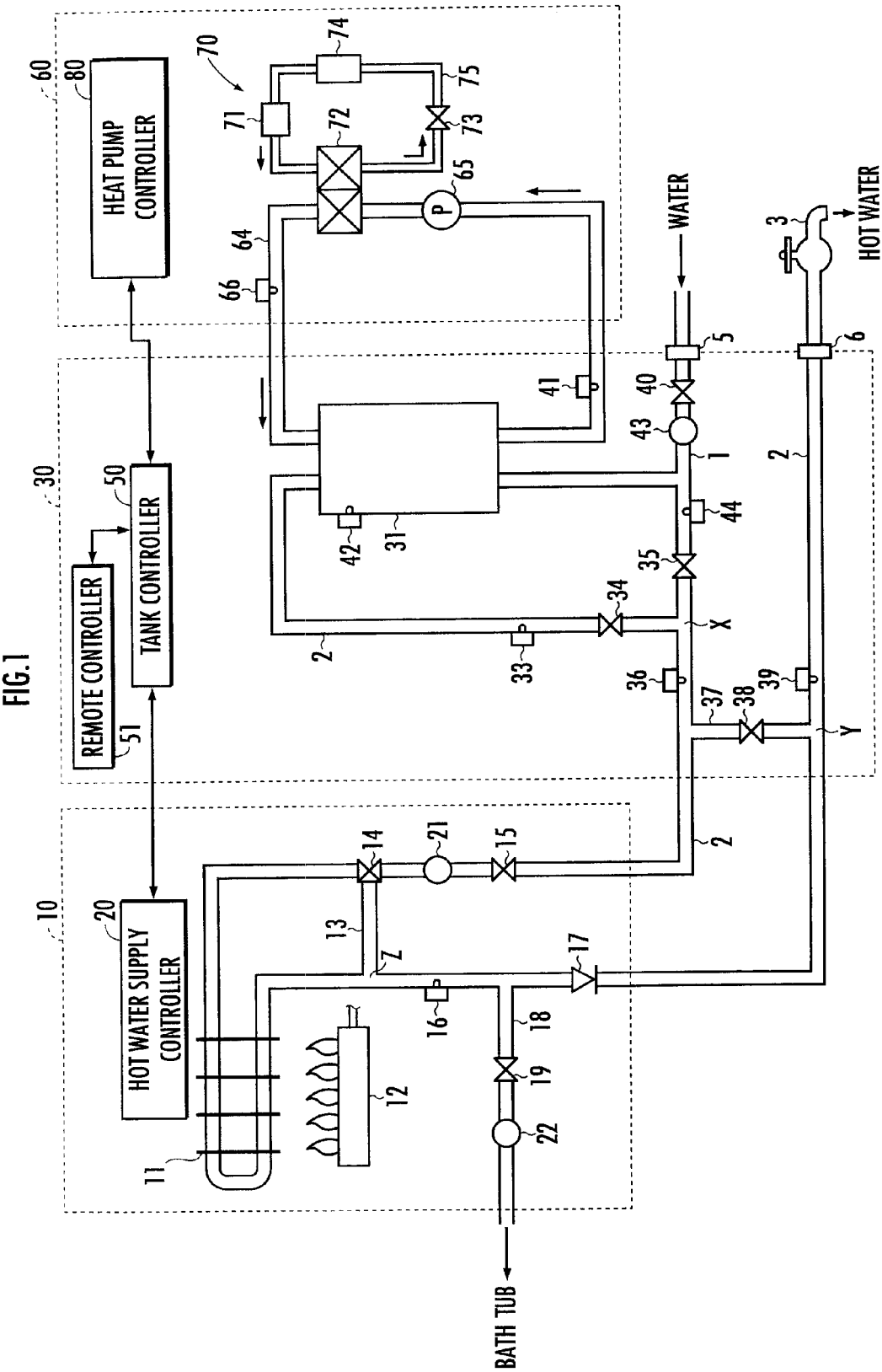
FIG. 1 is a structural diagram of a hot-water supply system of the present invention.

Hereinafter, an embodiment of the present invention will be described in detail with reference to FIG. 1 to FIG. 6. As illustrated in FIG. 1, a hot-water supply system according to the present embodiment is composed of a hot-water supply apparatus of an instant heating type 10, a tank unit 30, and a heat pump unit 60 (equivalent to a heating unit of the present invention).

The heat pump unit 60 is composed of a heat pump 70 having a compressor 71, a condenser 72, a decompressor 73, and a vaporizer 74 which are connected by a refrigerant circulating path 75. The condenser 72 is connected with a tank circulating path 64 connecting an upper portion and a lower portion of a hot-water tank 31 and is configured to heat water in the tank circulating path 64 according to heat exchange between the refrigerant in the refrigerant circulating path 75 and the water in the tank circulating path 64.

The tank circulating path 64 is disposed with a circulating pump 65 for circulating the water stored in the hot-water tank 31 in the tank circulating path 64, an outflow thermister 66 for detecting a temperature of the water supplied from the condenser 72 to the hot-water tank 31, and an inflow thermister 41 for detecting a temperature of the water supplied from the hot-water tank 31 to the condenser 72.

The signal of the temperature detected by the outflow thermister 66 is input to a heat pump controller 80 which is an electronic unit composed of a micro computer and the like. According to a control signal output from the heat pump controller 80, operations of the heat pump 70 and the circulating pump 65 are controlled.

The heat pump controller 80 is communicably connected with a tank controller 50. If a heating instruction signal is received from the tank controller 50, the heat pump controller 80 activates the circulating pump 65 and the heat pump 70 so as to maintain the water in the hot-water tank 31 around a predefined temperature (in the present embodiment, the predefined temperature is 45° C. or 60° C.) on the basis of the detection temperature by the outflow thermister 66 and the detection temperature by the inflow thermister 41 by using the data of an upper temperature limit of the hot-water in the tank and the detection temperature of the inflow thermister 41 transmitted from the tank controller 50.

The tank unit 30 is composed of the hot-water tank 31, a hot-water supply pipe 2 connected to the upper portion of the hot-water tank 31, a water supply pipe 1 connected to both the lower portion of the hot-water tank 31 and the hot-water supply pipe 2, a hot-water bypass pipe 37 bypassing the hot-water supply apparatus 10 to communicate the hot-water supply pipe 2 at the upstream side and the downstream side of the hot-water supply apparatus 10.

The tank unit 30 is provided with the inflow thermister 41 for detecting the temperature of water supplied from the hot-water tank 31 to the heat pump unit 60, a hot-water tank thermister 42 (equivalent to a hot-water storage temperature sensor of the present invention) for detecting the temperature of water stored in the hot-water tank 31, an inflow hot-water thermister 33 disposed at an upstream side close to a joint location X between the water supply pipe 1 and the hot-water supply pipe 2, a tank water flow sensor 43 (equivalent to a water current sensor of the present invention) for detecting a flow of the water current in the water supply pipe 1, an inflow water thermister 44 disposed in the water supply pipe 1, a hot-water flow regulation valve 34 for regulating a flow of water supplied from the hot-water tank 31 to the hot-water supply pipe 2, a water flow regulation valve 35 for regulating a flow of water supplied from the water supply pipe 1 to the hot-water supply pipe 2, a pressure reducing valve 40 with a check valve disposed in the water supply pipe 1, a mixing thermister 36 disposed between the joint location X of the water supply pipe 1 to the hot-water supply pipe 2 and a location where the hot-water bypass pipe 37 is disposed, a bypass valve 38 for closing or opening the hot-water bypass pipe 37, a hot-water tap thermister 39 for detecting the temperature of water supplied to the downstream side of a joint location Y between the hot-water bypass pipe 37 and the hot-water supply pipe 2.

The detection signals of temperature by the hot-water tank thermister 42, the inflow hot-water thermister 33, the inflow water thermister 44, the mixing thermister 36, the hot-water tap thermister 39 and the inflow thermister 41, and the detection signals of the water flow in the water supply pipe 1 by the tank water flow sensor 43 are input into the tank controller 50 (equivalent to a controller of the present invention) which is an electronic unit composed of a micro computer and the like.

Thereafter, the hot-water flow regulation valve 34, the water flow regulation valve 35 and the bypass valve 38 are controlled according to control signals output from the tank controller 50.

The tank controller 50 monitors the detection temperature of the hot-water tank thermister 42, and transmits heating instruction signals to the heat pump controller 80 to maintain the hot-water in the hot-water tank 31 around 45° C. or 60° C. depending on the time slots.

The tank controller 50 performs a process to sterilize bacteria (such as *Legionella* or the like) (sterilization process) in the hot-water of the hot-water tank 31. When the detection temperature of the hot-water tank thermister 42 has been equal to or lower than 58° C. (equivalent to a re-heating determination temperature of the present invention) for at least 94 hours (equivalent to a re-heating determination time), the instruction signals for heating the hot-water is transmitted to the heat pump controller 80 so as to perform the sterilization process by maintaining the hot-water in the hot-water tank 31 heated at least to 58° C. (equivalent to a sterilization temperature of the present invention) for 15 minutes.

The tank controller 50 configured to perform the sterilization process on the hot-water in the hot-water tank 31 is equivalent to a sterilization processing unit of the present invention.

The tank controller 50 is connected with a remote controller 51 (having functions of a hot-water supply temperature setting unit configured to set a desired hot-water supply temperature of the present invention) including a temperature switcher (not shown) for switching a desired hot-water supply temperature (predefined hot-water supply temperature: the temperature of hot-water supplied from a tap of the hot-water supply pipe 2) and a bath temperature (predefined bath temperature: the temperature of hot-water supplied to a bath tub via a hot-water accumulation pipe 18 to be described hereinafter), a mode switcher (not shown) for switching a normal hot-water supply mode (where a hot-water accumulation valve 19 is closed so as to supply the hot-water from the tap of the hot-water supply pipe 2, which will be described hereinafter) and a hot-water accumulation mode (where the hot-water accumulation valve 19 is opened so as to supply the hot-water from the hot-water accumulation pipe 18 to the bath tub) and the like.

The hot-water supply pipe 2 is connected to an upper portion of the hot-water tank 31, and the water supply pipe 1 is connected to a lower portion of the hot-water tank 31. Thus, when the hot-water is supplied from the hot-water tank 31 to the hot-water supply pipe 2, the water is supplied from the water supply pipe 1 to the lower portion of the hot-water tank 31 accordingly. Thereby, a layer of hot-water of a high temperature is formed in the upper portion of the hot-water tank 31 and a layer of water is formed in the lower portion thereof.

As the hot-water is supplied from the hot-water tank 31, the layer of hot-water of a high temperature decreases, which leads to a hot-water shortage state in which the detection temperature by the hot-water tank thermister 42 becomes equal to or lower than the desired hot-water supply temperature set through the remote controller 51 (the desired hot-water supply temperature is referred to as the predefined hot-water supply temperature set through the remote controller 51 in the normal hot-water supply mode and as the predefined bath temperature set through the remote controller 51 in the hot-water accumulation mode).

The determination of whether or not the hot-water tank 31 is in the hot-water shortage state may be performed in such a way that if the detection temperature by the hot-water tank thermister 42 is equal to or lower than a hot-water shortage determination temperature set around the desired hot-water supply temperature, then the hot-water tank 31 is determined to be in the hot-water shortage state. In the present embodiment, the desired hot-water supply temperature is set equal to the hot-water shortage determination temperature.

When the sterilization process is not performed on the hot-water in the hot-water tank 31, the detection temperature by the hot-water tank thermister 42 is higher than the desired hot-water supply temperature (not in the hot-water shortage state), and the water current is detected to have a flow equal to or greater than a predefined lower flow limit by the tank water flow sensor 43, the tank controller 50 performs a temperature regulation control via mixing for controlling the opening degrees of the hot-water flow regulation valve 34 and the water flow regulation valve 35 so as to make the detection temperature of the mixing thermister 36 or the hot-water tap thermister 39 equal to a desired temperature. Specifically, the tank controller 50 opens the bypass valve 38 in the normal hot-water supply mode and closes the bypass valve 38 in the hot-water accumulation mode.

On the other hand, when the detection temperature by the hot-water tank thermister 42 is equal to or lower than the desired hot-water supply temperature (in the hot-water shortage state) and the water current is detected to have a flow equal to or greater than the lower flow limit by the tank water flow sensor 43, the tank controller 50 closes the bypass valve 38 to supply the whole water from the hot-water tank 31 and the water supply pipe 1 to the hot-water supply apparatus 10. Here, in the hot-water supply apparatus 10, a temperature regulation control via heating is performed, which will be described hereinafter.

The hot-water supply apparatus 10 is composed of a heat exchanger 11 disposed in the midway of the hot-water supply pipe 2, a burner 12 for heating the heat exchanger 11, a hot-water bypass pipe 13 bypassing the heat exchanger 11 to communicate the hot-water supply pipe 2 at the upstream side and the downstream side of the heat exchanger 11, and the hot-water accumulation pipe 18 connecting the bath tub (not shown) with the hot-water supply pipe 2 at a downstream side of a joint location Z between the hot-water supply pipe 2 and the hot-water bypass pipe 13.

The hot-water supply pipe 2 is disposed with a bypass servo valve 14 for regulating the opening degree of the hot-water bypass pipe 13, a water flow servo 15 for regulating the flow of the water supplied to the hot-water supply apparatus 10, a hot-water flow sensor 21 for detecting the flow of the water supplied to the heat exchanger 11 and the hot-water bypass pipe 13, a thermister 16 of the hot-water supply apparatus for detecting the temperature of the hot-water supplied to the downstream side of the joint location Z between the hot-water supply pipe 2 and the hot-water bypass pipe 13, and a check valve 17. The hot-water accumulation pipe 18 is disposed with a hot-water accumulation flow sensor 22 for detecting the flow of the hot-water in the hot-water accumulation pipe 18 and the hot-water accumulation valve 19 for opening or closing the hot-water accumulation pipe 18.

Detection signals of temperature by the thermister 16, detection signals of hot-water flow by the hot-water flow sensor 21, and detection signals of hot-water flow by the hot-water accumulation flow sensor 22 are input into a hot-water supply controller 20 which is an electronic unit composed of a micro computer and the like. Thereafter, the bypass servo valve 14, the water flow servo 15, the burner 12 and the hot-water accumulation valve 19 are controlled according to control signals output from the hot-water supply controller 20.

The hot-water supply controller 20 is communicably connected with the tank controller 50, and goes into a heating permitted state if an instruction signal for permitting heating is received from the tank controller 50. When the hot-water current is detected to have a flow equal to or greater than a predefined lower flow limit by the hot-water flow sensor 21, the hot-water supply controller 20 performs the temperature regulation control via heating for controlling the combustion amount of the burner 12 so as to make the detection temperature of the thermister 16 equal to a desired hot-water supply temperature. On the other hand, if an instruction signal for prohibiting heating is received from the tank controller 50, the hot-water supply controller 20 goes into a heating prohibited state to prohibit the temperature regulation control via heating from being performed.

When a hot-water accumulating operation (hot-water accumulation mode) is performed to supply a predefined amount of hot-water to the bath tub (not shown), the hot-water supply controller 20 opens the hot-water accumulation valve 19 to accumulate in the bath tub the hot-water to be detected by the hot-water accumulation flow sensor 22. After the accumulated amount of hot-water in the bath tub reaches the predefined amount, the hot-water supply controller 20 closes the hot-water accumulation valve 19 to terminate the hot-water accumulating operation.

Hereinafter, with reference to the flow charts illustrated in FIG. 2 to FIG. 6, the operation of the tank controller 50 will be described.

Figure 2:
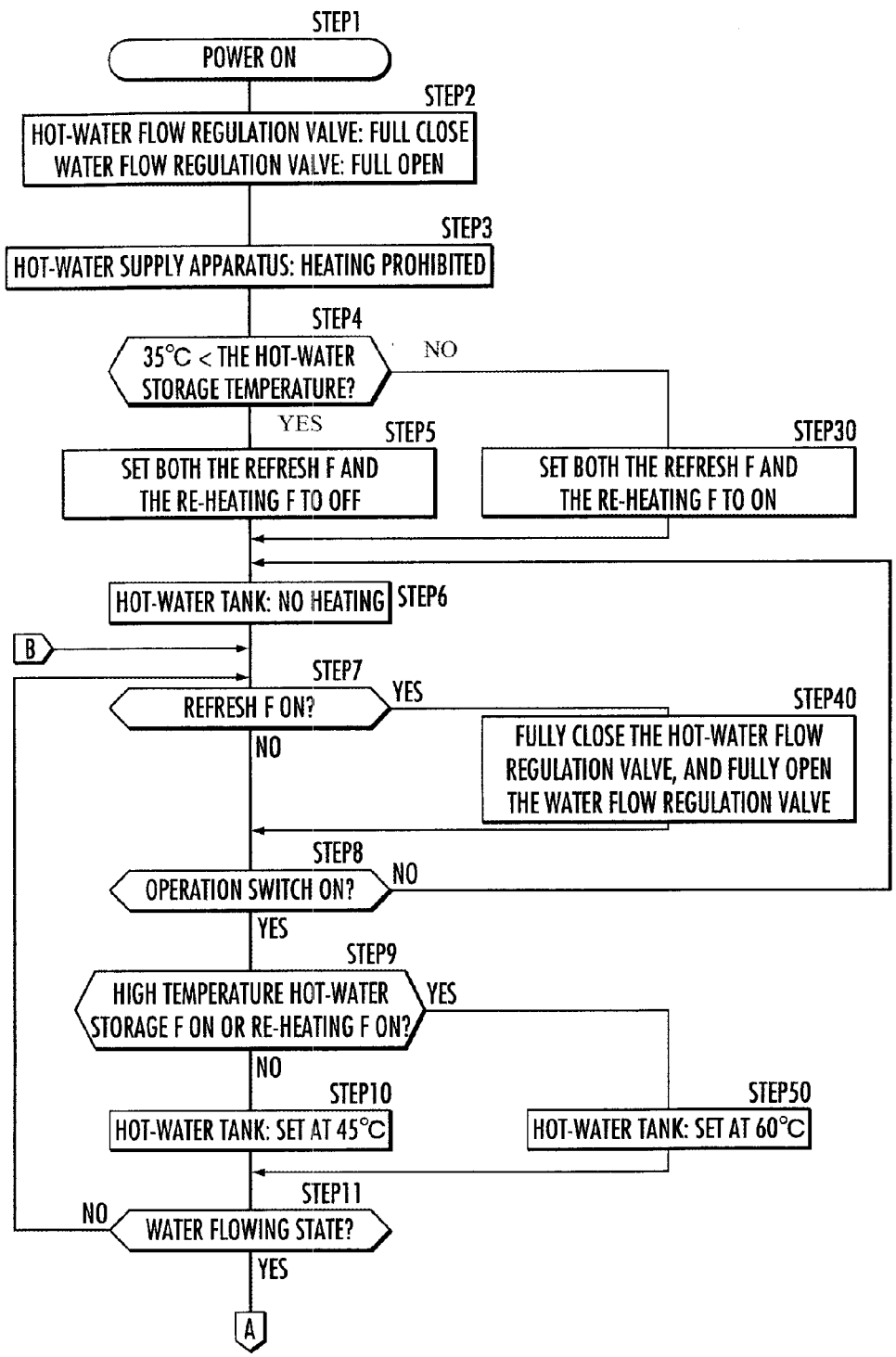
FIG. 2 is a flow chart illustrating an operation of a tank unit illustrated in FIG. 1.

When the power of the tank unit 30 is turned on in STEP 1 of FIG. 2, the process proceeds to STEP 2 where the tank controller 50 fully closes the hot-water flow regulation valve 34 and fully opens the water flow regulation valve 35. In a subsequent STEP 4, the tank controller 50 determines whether or not the detection temperature by the hot-water tank thermister 42 is higher than 35° C. (equivalent to a sterilization determination temperature of the present invention).

If the detection temperature by the hot-water tank thermister 42 is lower than 35° C. in STEP 4, it is possible that the continuation of low temperature of the water in the hot-water tank 31 results in the increment of bacteria in the water. Therefore, it is necessary to sterilize the water in the hot-water tank 31 immediately. Thus, the process branches to STEP 30 where the tank controller 50 turns (sets) on a refresh flag (in the drawings, written as refresh F) giving the instruction of prohibiting the use of hot-water in the hot-water tank 31 and a re-heating flag (in the drawings, written as re-heating F) giving the instruction of re-heating the hot-water in the hot-water tank 31. Thereafter, the process proceeds to STEP 6 where the tank controller 50 stops the heating of the water in the hot-water tank 31, then proceeds to STEP 7.

On the other hand, if the detection temperature by the hot-water tank thermister 42 is not lower than 35° C. in STEP 4, it can be assumed that the power supply to the tank unit 30 is temporarily shut down due to a power failure or the like and is resumed before the temperature of the hot-water in the hot-water tank 31 decreases too much. Therefore, it is not necessary to sterilize the water in the hot-water tank 31 immediately. The process proceeds to STEP 5 where the tank controller 50 turns off (resets) both the refresh flag and the re-heating flag. Thereafter, the process proceeds to STEP 6 where the tank controller 50 stops the heating of the water in the hot-water tank 31, then proceeds to STEP 7.

In STEP 7, the tank controller 50 determines whether or not the refresh flag is ON. If it is determined that the refresh flag is ON, the process branches to STEP 40; on the other hand, if it is determined that the refresh flag is not ON, the process proceeds to STEP 8. In STEP 40, the tank controller 50 fully closes the hot-water flow regulation valve 34, fully opens the water flow regulation valve 35, and prohibits the use of the hot-water in the hot-water tank 31.

In STEP 8, the tank controller 50 determines whether or not an operation switch (not shown) disposed in the remote controller 51 is ON. If it is determined that the operation switch is ON, the process proceeds to STEP 9; on the other hand, if it is determined that the operation switch is not ON, the process branches to STEP 6. The operation switch is used to instruct the switching between an operating state where the hot-water supply is enabled by the hot-water supply system and a standby state where the hot-water supply is disabled by the hot-water supply system. When the operation switch is turned on, the operating state is enabled.

If it is determined that the operation switch is ON, the process proceeds to STEP 9 where the tank controller 50 determines whether or not any of a high temperature hot-water storage flag (in the drawings, written as high temperature hot-water storage F) and the re-heating flag is ON. If it is determined that any of the high temperature hot-water storage flag and the re-heating flag is ON, the process proceeds to STEP 50 where the tank controller 50 transmits a heating instruction signal for instructing the storage of hot-water at 60° C. to the heat pump controller 80.

Accordingly, the heating by the heat pump 70 is performed to maintain the temperature of the hot-water in the hot-water tank 31 around 60° C. The reason for setting the temperature at 60° C. is to cope with the sterilization of bacteria in the hot-water of the hot-water tank 31 and the use of the hot-water in a large amount.

Meanwhile, if it is determined that the high temperature hot-water storage flag and the re-heating flag are both not ON in STEP 9, the process proceeds to STEP 10. The tank controller 50 transmits a heating instruction signal for instructing the storage of hot-water at 45° C. to the heat pump controller 80. Accordingly, the heating by the heat pump 70 is performed to maintain the temperature of the hot-water in the hot-water tank 31 around 45° C. The reason for setting the temperature at 45° C. is to inhibit the radiation of heat from the hot-water in the hot-water tank 31 so as to store the hot-water in a better efficiency.

Subsequently in STEP 11, the tank controller 50 determines whether or not a water flowing state in which a water current having a lower flow limit is detected by the tank water flow sensor 43 is present. If the water flowing state is present, the process proceeds to STEP 12 of FIG. 3; otherwise, the process returns to STEP 7.

Figure 3:
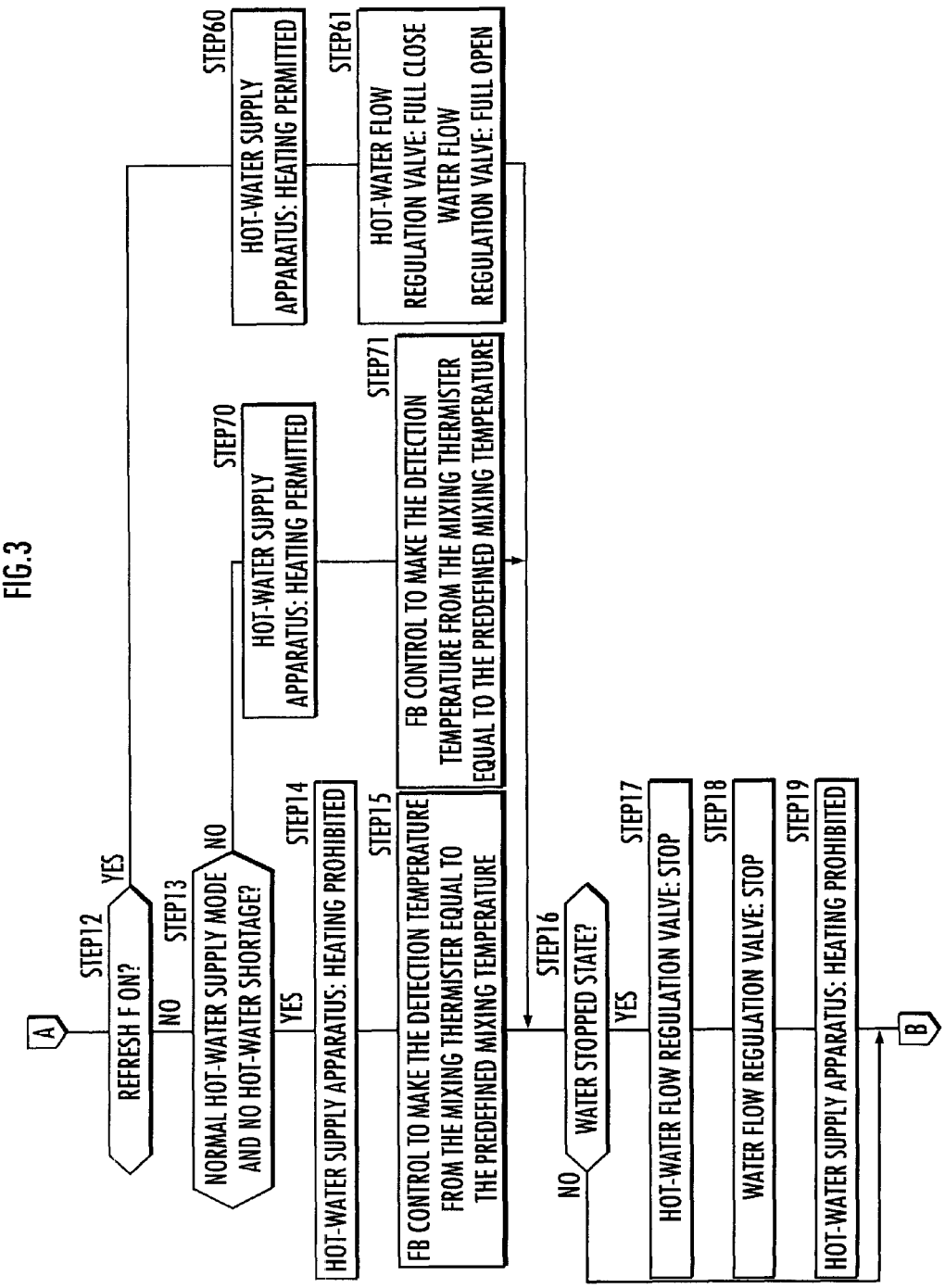
FIG. 3 is a flow chart illustrating an operation of a tank unit illustrated in FIG. 1.

In FIG. 3, STEP 12 to STEP 15, STEP 60 to STEP 61, and STEP 70 to STEP 71 are related to the process for supplying the hot-water at the desired hot-water supply temperature (referring to the predefined hot-water supply temperature in the normal hot-water supply mode or the predefined bath temperature in the hot-water accumulation mode) according to the temperature regulation control via mixing or the temperature regulation control via heating. The configuration for performing the temperature regulation control via mixing and the temperature regulation control via heating according to STEP 12 to STEP 15, STEP 60 to STEP 61, and STEP 70 to STEP 71 is equivalent to a temperature regulation control unit of the present invention.

In STEP 12, the tank controller 50 determines whether or not the refresh flag is ON. If it is determined that the refresh flag is ON, the process branches to STEP 60 where the tank controller 50 transmits an instruction signal for permitting heating to the hot-water supply controller 20. In the subsequent STEP 61, the tank controller 50 fully closes the hot-water flow regulation valve 34 and fully opens the water flow regulation valve 35; thereafter, the process proceeds to STEP 16.

According to the process in STEP 60 and STEP 61, the heating by the hot-water supply apparatus 10 is permitted in a state where the hot-water flow regulation valve 34 is fully closed and the use of the hot-water in the hot-water tank 31 is prohibited. Thereafter, the combustion amount of the burner 12 and the opening degree of the bypass servo valve 14 are controlled by the hot-water supply controller 20 so as to make the detection temperature by the thermister 16 equal to the desired hot-water supply temperature (referring to the predefined hot-water supply temperature in the normal hot-water supply mode or the predefined bath temperature in the hot-water accumulation mode) (the temperature regulation control via heating).

On the other hand, if it is determined that the refresh flag is not ON in STEP 12, the process proceeds to STEP 13 where the tank controller 50 determines whether or not the mode is in the normal hot-water supply mode and the hot-water shortage (a state where the detection temperature by the hot-water tank thermister 42 is equal to or lower than the desired hot-water supply temperature) is not occurring.

If it is determined that the mode is in the normal hot-water supply mode and the hot-water shortage is not occurring, the process proceeds to STEP 14 where the tank controller 50 transmits an instruction signal for prohibiting heating to the hot-water supply controller 20. Accordingly, the heating by the hot-water supply apparatus 10 is prohibited.

In the subsequent STEP 15, the tank controller 50 alters the opening degrees of the hot-water flow regulation valve 34 and the water flow regulation valve 35 to regulate the mixing ratio between the hot-water supplied from the hot-water tank 31 to the hot-water supply pipe 2 and the water supplied from the water supply pipe 1 to the hot-water supply pipe 2 (the temperature regulation control via mixing) so as to make the detection temperature by the mixing thermister 36 equal to the desired hot-water supply temperature (the predefined hot-water supply temperature); thereafter, the process proceeds to STEP 16.

If it is determined that the mode is in the hot-water accumulation mode and the hot-water shortage is not occurring in STEP 13, the process branches to STEP 70. The tank controller 50 transmits an instruction signal for permitting heating to the hot-water supply controller 20. Accordingly, the heating by the hot-water supply apparatus 10 is permitted.

In the subsequent STEP 71, the tank controller 50 alters the opening degrees of the hot-water flow regulation valve 34 and the water flow regulation valve 35 to regulate the mixing ratio between the hot-water supplied from the hot-water tank 31 to the hot-water supply pipe 2 and the water supplied from the water supply pipe 1 to the hot-water supply pipe 2 so as to satisfy the predefined mixing temperature set according to the following expression (1); thereafter, the process proceeds to STEP 16.

Predefined mixing temperature=Desired hot-water supply temperature−Minimum capacity temperature (1)

Wherein, the desired hot-water supply temperature: the predefined hot-water supply temperature in the normal hot-water supply mode or the predefined bath temperature in the hot-water accumulation mode; and the minimum capacity temperature: temperature increment of the water in the present flow (the present flow of the water current detected by the hot-water flow sensor 21) when heated by the hot-water supply apparatus 10 with the minimum capacity.

Thus, the hot-water having a temperature controlled to be equal to the mixing temperature of the expression (1) in STEP 71 is supplied to the hot-water supply apparatus 10, and the hot-water supply controller 20 controls the combustion amount of the burner 12 and the opening degree of the bypass servo valve 14 so as to make the detection temperature by the thermister 16 equal to the desired hot-water supply temperature (referring to the predefined hot-water supply temperature in the normal hot-water supply mode or the predefined bath temperature in the hot-water accumulation mode) (the temperature regulation control via heating).

Thereafter, in STEP 16, the tank controller 50 determines whether or not a water stopped state in which the water current having a water flow equal to or greater than a lower flow limit is not detected by the tank water flow sensor 43 is present. If it is determined that the water stopped state is present, the process proceeds to STEP 17 where the tank controller 50 stops the hot-water flow regulation valve 34 (maintained at the present opening degree) and stops the water flow regulation valve 35 (maintained at the present opening degree) in the subsequent STEP 18. Next in STEP 19, the tank controller 50 transmits an instruction signal for prohibiting heating to the hot-water supply controller 20; thereafter, the process returns to STEP 7 of FIG. 2.

Figure 4:
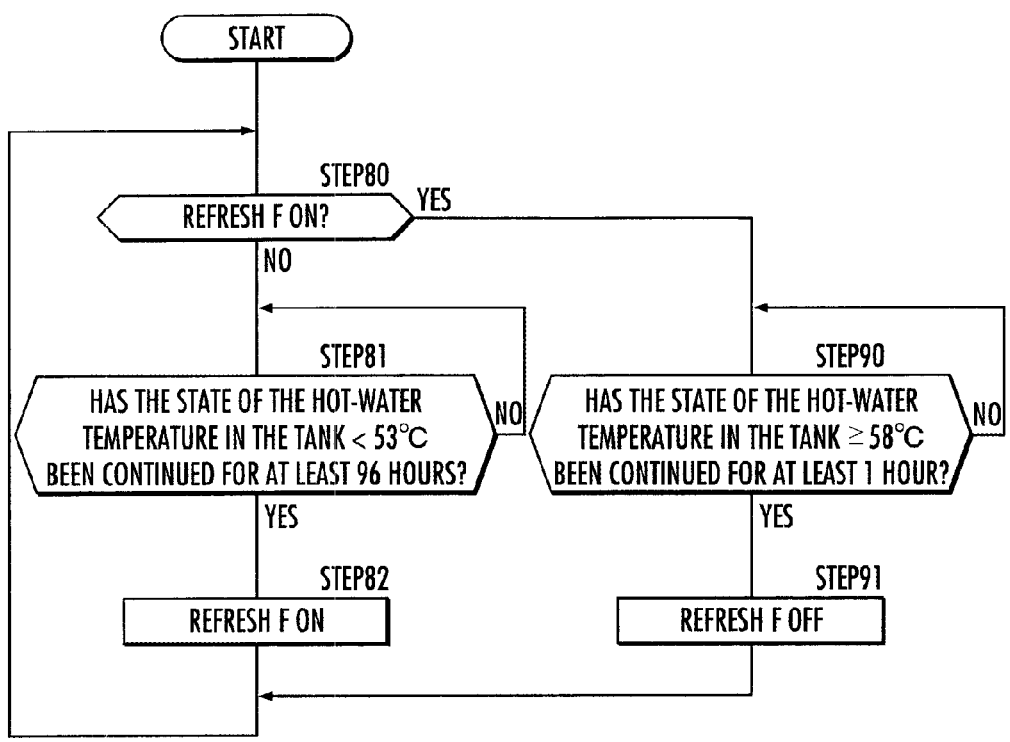
FIG. 4 is a flow chart illustrating ON/OFF setting of a refresh flag.
Figure 5:
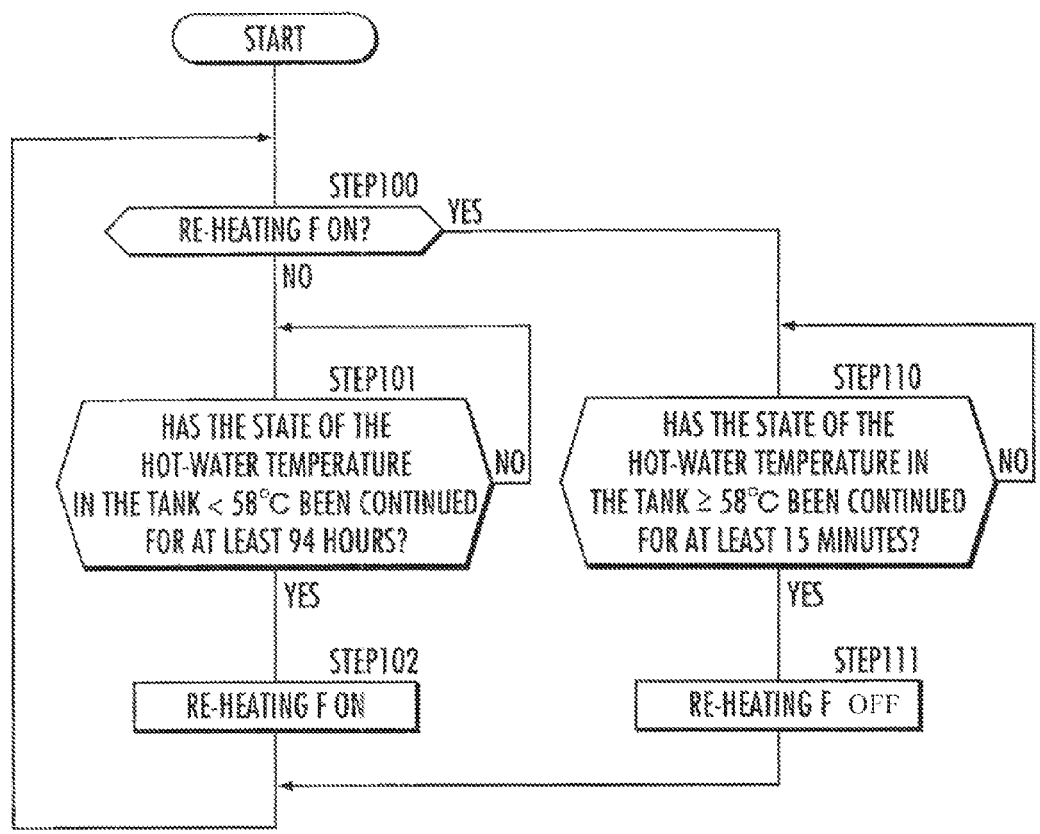
FIG. 5 is a flow chart illustrating ON/OFF setting of a re-heating flag.

Hereinafter, with reference to the flow chart in FIG. 4, the ON/OFF (set/reset) process of the refresh flag will be described. The process according to the flow charts in FIG. 4 to FIG. 6 is performed in parallel to the process according to the flow charts in FIG. 2 and FIG. 3.

In STEP 80, the tank controller 50 determines whether or not the refresh flag is ON. If it is determined that the refresh flag is not ON, the process proceeds to STEP 81. In STEP 81, if the temperature of hot-water in the tank (the detection temperature by the hot-water tank thermister 42) has been lower than 53° C. (equivalent to the determination temperature for prohibiting the use of hot-water in the hot-water tank of the present invention) over at least 96 hours (equivalent to the determination time for prohibiting the use of hot-water in the hot-water tank of the present invention), the tank controller 50 sets the refresh flag to ON in the next STEP 82, and the process returns to STEP 80.

In STEP 81, the condition that the temperature of hot-water in the tank has been lower than 53° C. over at least 96 hours is based on the assumption that the presence of bacteria in the water stored in the hot-water tank 31 may surpass a predefined allowable level due to long-term storage of the water in the hot-water tank 31 at a low temperature.

On the other hand, if the refresh flag is determined to be ON in STEP 80, the process proceeds to STEP 90. If the hot-water storage temperature (the detection temperature by the hot-water tank thermister 42) has been equal to or higher than 58° C. (equivalent to the sterilization temperature of the present invention) over at least 1 hour, the tank controller 50 sets the refresh flag to OFF in the next STEP 91, and the process returns to STEP 80.

The condition that the temperature of hot-water in the tank has been equal to or higher than 58° C. over at least 1 hour in STEP 90 is based on the assumption that under such condition the bacteria in the hot-water of the hot-water tank 31 surpassed the predefined allowable level will be sterilized through heating.

Hereinafter, with reference to the flow chart in FIG. 5, the ON/OFF (set/reset) process of the re-heating flag will be described.

In STEP 100, the tank controller 50 determines whether or not the re-heating flag is ON. If it is determined that the re-heating flag is not ON, the process proceeds to STEP 101.

In STEP 101, if the temperature of hot-water in the tank (the detection temperature by the hot-water tank thermister 42) has been lower than 58° C. (equivalent to the re-heating determination temperature of the present invention) over at least 94 hours (equivalent to the re-heating determination time of the present invention), the tank controller 50 sets the re-heating flag to ON in the next STEP 102, and the process returns to STEP 100.

In STEP 101, the condition that the temperature of hot-water in the tank has been lower than 58° C. over at least 94 hours is based on the assumption that the bacteria in the water stored in the hot-water tank 31 will increase at a speed to have the presence thereof close to the predefined allowable level due to long-term storage of the water in the hot-water tank 31 at a low temperature.

On the other hand, if the re-heating flag is determined to be ON in STEP 100, the process proceeds to STEP 110. If the hot-water storage temperature (the detection temperature by the hot-water tank thermister 42) has been equal to or higher than 58° C. over at least 15 minutes, the tank controller 50 sets the re-heating flag to OFF in the next STEP 111, and the process returns to STEP 100.

The condition that the temperature of hot-water in the tank has been equal to or higher than 58° C. over at least 15 minutes in STEP 110 is based on the assumption that under such condition the bacteria in the hot-water of the hot-water tank 31 having the presence thereof close to the predefined allowable level will be sterilized through heating.

Hereinafter, with reference to the flow chart in FIG. 6, the ON/OFF (set/reset) process of the high temperature hot-water storage flag will be described.

The tank controller 50 acquires the data of current time from a timer unit (not shown) in STEP 120. Subsequently in STEP 121, the tank controller 50 determines whether or not the current time is in a predefined high temperature time slot. The predefined high temperature time slot is set as a time slot from early-evening to bedtime in which the hot-water is supposed to be used in an increasing amount (for example, from 18:00 to 22:00). The predefined high temperature time slot may be set through the remote controller 51.

If it is determined that the current time is in the predefined high temperature time slot, the process branches to STEP 130 where the tank controller 50 turns (set) on the high temperature hot-water storage flag, thereafter, the process returns to STEP 120. If the current time is not in the predefined high temperature time slot, the process proceeds to STEP 122 where the tank controller 50 determines whether or not the hot-water accumulation operation is running.

If it is determined that the hot-water accumulation operation is running, the process branches to STEP 130 where the tank controller 50 turns (set) on the high temperature hot-water storage flag, thereafter, the process returns to STEP 120. If the hot-water accumulation operation is not running, the process proceeds to STEP 123 where the tank controller 50 turns off the high temperature hot-water storage flag, thereafter, the process returns to STEP 120.

According to the process illustrated in FIG. 6, since the hot-water is stored in the hot-water tank 31 at a high temperature (60° C.) in the time slot where the hot-water is used in an increasing amount and when the hot-water accumulation operation is running, the hot-water shortage is prevented from occurring in the hot-water tank 31, which makes it possible to perform the temperature regulation control via mixing.

In the present embodiment, it is described that the hot-water supply system is provided with the hot-water bypass pipe 37 for bypassing the hot-water supply apparatus 10 and the bypass valve 38 for closing or opening the hot-water bypass pipe 37; however, it is possible to apply the present invention to a hot-water supply system without a hot-water bypass pipe and a bypass valve for closing or opening the hot-water bypass pipe to attain the same effects.

In the present embodiment, the re-heating determination time (94 hours) of the present invention is set shorter than the determination time for prohibiting the use of hot-water in the hot-water tank (96 hours); however, it is acceptable to set them with the same length. Further, in the present embodiment, the determination temperature for prohibiting the use of hot-water in the hot-water tank of the present invention (53° C.) is set lower than the re-heating determination temperature (58° C.); however, it is acceptable to set them at the same temperature.

In the present embodiment, it is described that the hot-water supply system is provided with the hot-water accumulation pipe 18 and the hot-water accumulation valve 19 to supply hot-water in a normal hot-water supply mode and a hot-water accumulation mode; however, it is possible to apply the present invention to a hot-water supply system without a hot-water accumulation pipe so as to supply hot-water only in the normal hot-water supply mode.

In the present embodiment, it is described that the hot-water supply system is provided with the heat pump as a heating unit to heat the water in the hot-water tank 31; however, it is acceptable to use other heating unit such as a solar system or the like as a heating unit.

In the present embodiment, the sterilization of bacteria in the water of the hot-water tank 31 is performed according to the process of STEP 4, STEP 5 and STEP 30 in FIG. 1 immediately after the power is turned on and the detection temperature by the hot-water tank thermister 42 is low; however, even without performing such process, the effects of the present invention can be attained.

Industrial Applicability

As described above, according to the hot-water supply system of the present invention, even the hot-water in the hot-water tank is not set to be boiled at regular intervals, the hot-water containing more bacteria can be prevented from being supplied from the hot-water tank; therefore, the present invention is useful for a hot-water supply system provided with a hot-water tank.

What is claimed is:

1. A hot-water supply system comprising:
a hot-water tank,
a hot-water supply pipe connected to the hot-water tank,
a water supply pipe connected to the hot-water tank and the hot-water supply pipe,
a heating unit configured to heat the water in the hot-water tank,
a water current sensor configured to detect a water current in the water supply pipe,
a hot-water flow regulation valve disposed between a joint location of the hot-water supply pipe to the hot-water tank and a joint location of the hot-water supply pipe to the water supply pipe for regulating an opening degree of the hot-water supply pipe,
a water flow regulation valve disposed between a joint location of the water supply pipe to the hot-water tank and a joint location of the water supply pipe to the hot-water supply pipe for regulating an opening degree of the water supply pipe,
a hot-water storage temperature sensor configured to detect a temperature of the water in the hot-water tank,
a hot-water supply apparatus disposed in the midway of the hot-water supply pipe at a downstream side of the joint location between the hot-water supply pipe and the water supply pipe for heating the water flowing through the hot-water supply pipe, a hot-water supply temperature setting unit configured to set a desired hot-water supply temperature, and a temperature regulation control unit configured to perform a temperature regulation control via mixing by prohibiting the heating by the hot-water supply apparatus and regulating a mixing ratio of the hot-water supplied from the hot-water tank to the hot-water supply pipe and the water supplied from the water supply pipe to the hot-water supply pipe by the hot-water flow regulation valve and the water flow regulation valve so as to supply the hot-water having the desired hot-water supply temperature from the hot-water supply pipe when the water current is detected by the water current sensor and the detection temperature by the hot-water storage temperature sensor is higher than a hot-water shortage determination temperature set according to the desired hot-water supply temperature, and to perform a temperature regulation control via heating by permitting the heating by the hot-water supply apparatus so as to supply the hot-water having the desired hot-water supply temperature from the hot-water supply pipe when the water current is detected by the water current sensor and the detection temperature by the hot-water storage temperature sensor is equal to or lower than the hot-water shortage determination temperature, wherein the hot-water supply system further comprises a sterilization processing unit configured to perform a sterilization process by heating the hot-water in the hot-water tank equal to or higher than a sterilization temperature set according to an assumption that bacteria in the hot-water tank will be sterilized under such temperature by the heating unit when the detection temperature by the hot-water storage temperature sensor has been equal to or lower than a re-heating determination temperature set according to an assumption that the reproduction of bacteria in the hot-water tank will progress under such temperature over at least a predefined re-heating determination time, when the detection temperature by the hot-water storage temperature sensor has been equal to or lower than a determination temperature for prohibiting the use of hot-water in the hot-water tank which is set lower than the re-heating determination temperature over at least a determination time for prohibiting the use of hot-water in the hot-water tank set equal to or longer than the re-heating determination time, the temperature regulation control unit performs only the temperature regulation control via heating while maintaining the hot-water flow regulation valve in a closed state regardless of the detection temperature by the hot-water storage temperature sensor.

2. The hot-water supply system according to claim 1, wherein the sterilization processing unit is composed of a controller operated according to a power supply, and after the controller is actuated according to the initiation of the power supply, the sterilization processing unit determines whether or not the detection temperature by the hot-water storage temperature sensor is equal to or higher than a sterilization determination temperature set lower than the re-heating determination temperature and performs the sterilization process as soon as the detection temperature by the hot-water storage temperature sensor is lower than the sterilization determination temperature.

3. The hot-water supply system according to claim 2, wherein the sterilization determination temperature is set lower than the determination temperature for prohibiting the use of hot-water in the hot-water tank.

4. The hot-water supply system according to claim 1, wherein the re-heating determination time is shorter than the determination time for prohibiting the use of the hot water.

* * * * *